United States Patent [19]

Crowe et al.

[11] Patent Number: 5,184,291

[45] Date of Patent: Feb. 2, 1993

[54] CONVERTER AND INVERTER SUPPORT MODULE

[76] Inventors: Lawrence E. Crowe, 16409 Lindenwood Rd., Lindenwood, Ill. 61049; Mark W. Metzler, 50 Delburne Dr., Davis, Ill. 61019

[21] Appl. No.: 714,798

[22] Filed: Jun. 13, 1991

[51] Int. Cl.⁵ .......................................... H02M 5/458
[52] U.S. Cl. ....................................... 363/37; 363/132; 363/141; 363/144
[58] Field of Search .................. 363/36, 37, 132, 141, 363/144; 307/84; 361/388, 393, 394

[56] References Cited

U.S. PATENT DOCUMENTS

| | | | |
|---|---|---|---|
| 4,015,173 | 3/1977 | Nitsche | 361/388 |
| 4,039,900 | 8/1977 | Roback et al. | 361/388 |
| 4,783,728 | 11/1988 | Hoffman | 363/37 |
| 4,862,344 | 8/1989 | Emoto | 363/147 |
| 4,918,590 | 4/1990 | Ohtuka et al. | 363/37 |
| 4,965,710 | 10/1990 | Pelly et al. | 363/141 |
| 4,992,925 | 2/1991 | Meyer | 363/37 |

Primary Examiner—William H. Beha, Jr.
Attorney, Agent, or Firm—Marshall, O'Toole, Gerstein, Murray & Bicknell

[57] ABSTRACT

The inverter module according to the present invention includes a component support for supporting components attached thereto, an AC/DC converter attached to the support for converting input AC into DC, inverter switches attached to the support for inverting the DC into single-phase output AC, a switch controller attached to the support for controlling the inverter switches, and connectors for interconnecting the AC/DC converter, the inverter switches, and the switch controller so that input AC is converted to a single phase of output AC.

26 Claims, 11 Drawing Sheets

CONVERTER AND INVERTER SUPPORT MODULE

BACKGROUND OF THE INVENTION

The present invention relates to an inverter module which can be attached to and/or withdrawn from a chassis as a unit.

Power conversion systems, such as variable speed, constant frequency (VSCF) power conversion systems, are commonly used in applications wherein the power conversion system is contained on or within a chassis or rack, perhaps along with other components, so that the power conversion system can be installed as a unit. A typical application of such power conversion systems is on aircraft and aerospace vehicles in order to generate AC and DC power from a variable speed prime mover such as a jet engine. In such an application, variable frequency AC power may be produced by a brushless, synchronous generator driven by the jet engine. The variable frequency AC power is converted to DC by an AC/DC converter, such as a rectifier bridge incorporating a smoothing capacity An inverter is coupled to the AC/DC converter in order to transform the DC power into constant frequency AC power. Such AC power is provided to an AC load bus which supplies power to various points throughout the aircraft.

Space on aircraft is normally at a premium. Therefore, the instrumentality which supports the various control functions and provides power to the various loads on aircraft must be compact and easily installable. Quite often, electrical systems such as power conversion systems are packaged within a box which is dimensioned to geometrically fit within a contained space on the aircraft.

Prior packaging arrangements of power conversion systems have several drawbacks. When a component of the power conversion system fails, maintenance crews have the choice of either repairing the power conversion system on site or replacing the entire power conversion system box. Either choice is expensive. Furthermore, prior art power conversion system packages quite often had to provide multiple heat sinks for the various components of the power conversion system. For example, separate heat sinks were provided for the rectifier bridge of the AC/DC converter, for the inverter switches, and for the inverter filter which is often included in the power conversion system to reduce undesired harmonics.

SUMMARY OF THE INVENTION

The present invention offers a solution to these problems by providing a modularized power conversion system such that each module carries a single-phase inverter leg for providing single-phase output AC. The module according to the present invention includes a module support for supporting components attached thereto. An AC/DC converter for converting input AC into DC and inverter switches for inverting the DC into single-phase output AC are attached to the module support. A switch controller for controlling the inverter switches is also attached to the module support. Connectors interconnect the AC to DC converter, the inverter switches, and the switch controller so that input AC is converted to a single phase of output AC.

In a three-phase power conversion system, the system includes three modules, one for providing each phase of a three-phase output AC. Thus, when a component of the power conversion system fails, only the module containing the failed component needs to be removed or replaced leaving the other two original modules on or in the power conversion system box.

Also, the module support can be in the form of a single heat sink for heat sinking both the AC to DC converter and the inverter switches, thus reducing the complexity of the power conversion system package.

Thus, the power conversion system package according to the present invention eliminates an additional heat exchanger for the AC to DC converter, permits the power conversion system to be more easily tested, reduces bus work interconnecting the various elements of the power conversion system, promotes easier wiring of the power conversion system, and permits tighter control of stray inductances associated with the power conversion system wiring.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
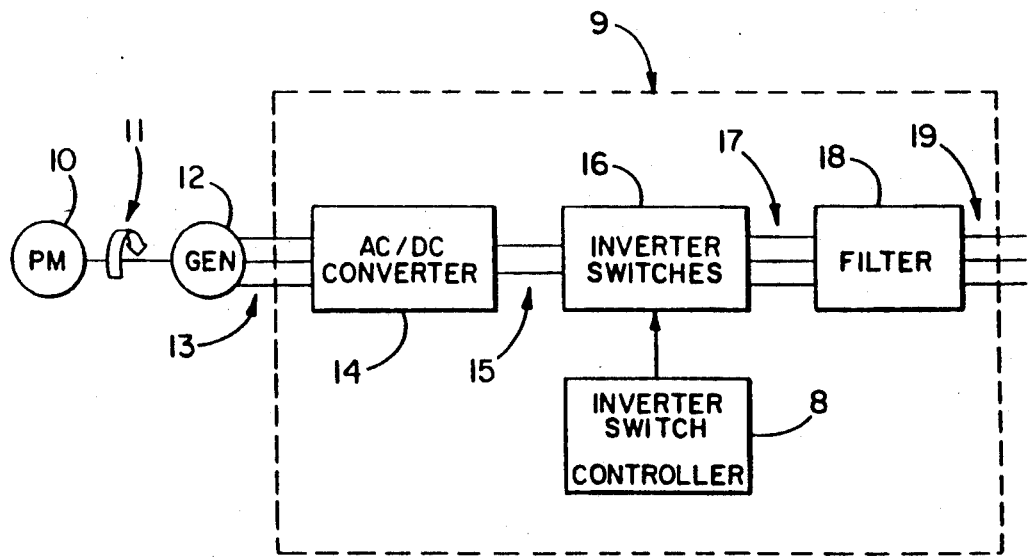
FIG. 1 is a block diagram of one application of the power conversion system according to the present invention.
Figure 1A:
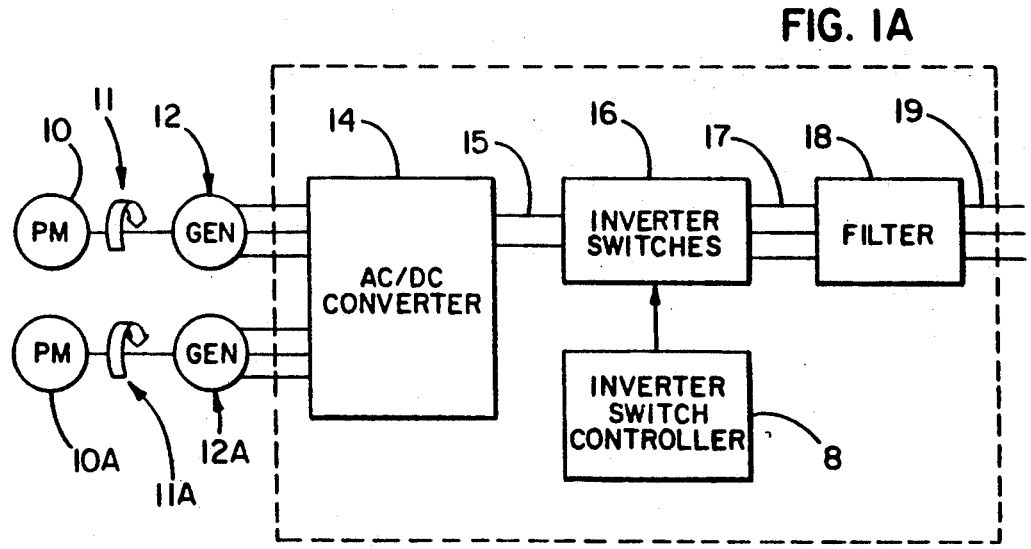
FIG. 1A is an alternative embodiment of the system shown in FIG. 1.

As shown in FIG. 1, prime mover 10, such as the jet engine of an aircraft, provides a rotating mechanical output at 11 to drive generator 12. Generator 12 provides wild frequency output AC on three-phase bus 13 to inverter 9 having an AC/DC converter 14 to rectify and smooth the wild frequency AC on bus 13 and to accordingly provide DC on DC link 15. Inverter 9 further includes inverter switches 16 under control of inverter switch controller 8, for inverting the DC from DC link 15 into constant frequency three-phase output over inverter output bus 17. This constant frequency three-phase output AC is filtered by filter 18 and supplied over AC load bus 19 to the loads of the power conversion system. As shown in FIG. 1A, a second generator 12A driven by second prime mover 10A can supply wild frequency AC to inverter 14. The generators 12 and 12A can be alternatively connected to inverter 14 or may supply inverter 14 in parallel.

Figure 2:
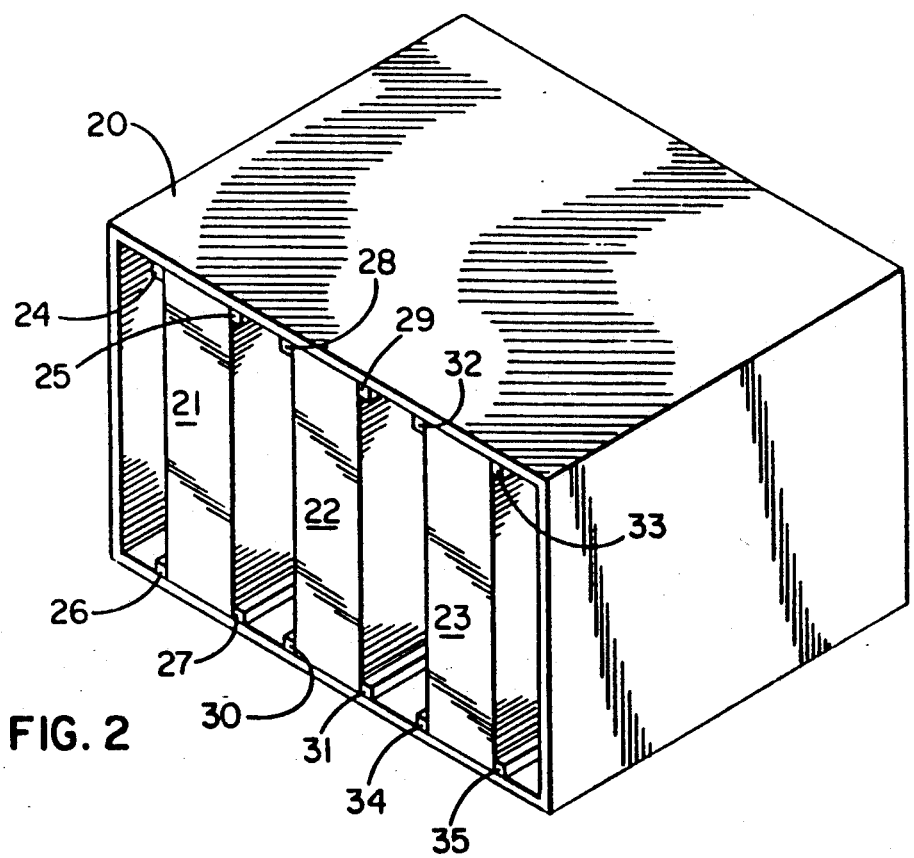
FIG. 2 illustrates a box or chassis which contains three inverter modules, each for supplying one phase of three-phase output AC.

Inverter 9 can be modularized into modules such that each module supports one inverter leg of inverter 9. Each module can support a portion of AC/DC converter 14, one leg of inverter switches 16 and inverter switch controller 8, and, optionally, a portion of filter 18. Thus, if the power conversion system is a three-phase power conversion system such as shown in FIG. 1, the power conversion system can be split up into three modules 21, 22, and 23 as shown in FIG. 2. Module 21 is received between upper tracks 24 and 25 and lower tracks 26 and 27 of a module support such as box or chassis 20. Similarly, upper tracks 28 and 29 and lower tracks 30 and 31 of box 20 receive second module 22. Upper tracks 32 and 33 and lower tracks 34 and 35 receive module 23. Box 20 can also include innerconnection buses (not shown) for innerconnecting modules 21, 22, and 23 for supplying three-phase output AC. Each module 21, 22, and 23 supplies a separate phase of the three-phase output AC. Box 20 is shown for illustration only and any type of box or chassis can be used for holding modules 21, 22 and 23.

Figure 3:
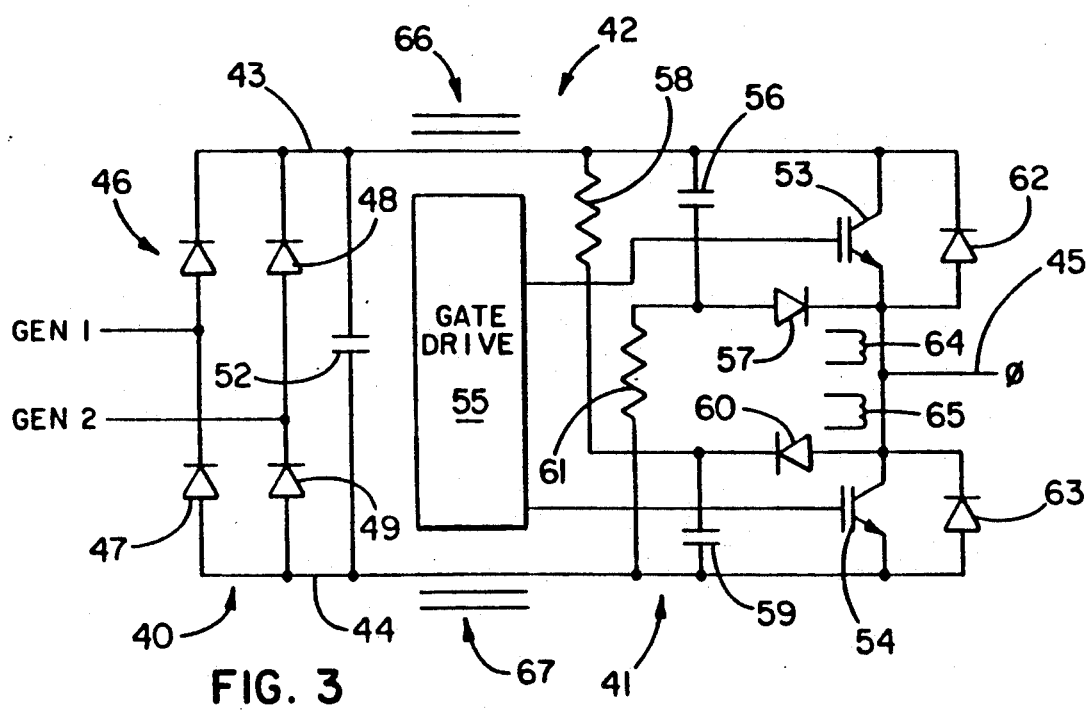
FIG. 3 shows one embodiment of an inverter leg which can be contained in one of the modules shown in FIG. 2.

For example, module 21 can include the circuit components shown in FIG. 3. Inverter leg 42 shown in FIG. 3 includes AC/DC converter 40 for providing DC on DC lines 43 and 44, inverter switches 41 for inverting the DC on lines 43 and 44 to single-phase output AC on line 45, and inverter switch controller 55 for controlling inverter switches 41. AC/DC converter 40 has a first pair of diodes 46 and 47 connected between DC lines 43 and 44 and a second pair of diodes 48 and 49 also connected between DC lines 43 and 44. One phase line of output from generator 12 is connected between diodes 46 and 47 and a corresponding phase line from generator 12A is connected between diodes 48 and 49 respectively. Two additional inverter legs such as the inverter leg shown in FIG. 3 can be used for the other two phases of a three phase system so that the three phase wild frequency AC supplied by generators 12 and/or 12A can be converted to constant frequency three phase AC output. Thus, the rectifier legs 46/47 and 48/49 of all three inverter legs will convert the three phase input to DC on DC rails 43 and 44 of each leg. Smoothing capacitor 52 is connected between DC lines 43 and 44. Accordingly, AC/DC converter 40 converts AC output from generator 12 into DC on lines 43, 44.

Inverter switches 41 include first inverter switch 53, which may be an IGBT, having its collector connected to DC line 43 and second inverter switch 54 having its emitter connected to second DC line 44. The emitter of switch 53 and the collector of switch 54 are connected together. The gates of switches 53 and 54 are connected to inverter switch controller or gate drive 55 which may be any known gate drive for controlling switches 53 and 54 to convert the DC on lines 43 and 44 into single-phase output AC on output line 45. For example, gate drive 55 may supply pulse width modulated pulses to the gates of inverter switches 53 and 54 for operating switches 53 and 54 for supplying single-phase AC output on output line 45. If three-phase output AC is to be supplied by the power conversion system, then two additional legs similar to those shown in FIG. 3 must also be provided each having its own gate drive. The three gate drives need to differ only in that their outputs must be separated in phase from one another by 120°. These three inverter legs can be controlled, as an example, in accordance with the power conversion system disclosed in U.S. Pat. No. 4,882,120.

Snubber circuits are provided for transistors 53 and 54. Accordingly, capacitor 56 and diode 57 are connected in series between DC line 43 and the emitter of switch 53. The junction of capacitor 56 and diode 57 is connected by a resistor 61 to DC line 44. Also, diode 60 and capacitor 59 are connected in series from the collector of switch 54 to DC line 44. Resistor 58 connects the junction of diode 60 and capacitor 59 to DC line 43. Flyback diode 62 is connected from the emitter of switch 53 to its collector and flyback diode 63 is connected from the emitter of switch 54 to its collector. Current transformer 64 may be provided for sensing the output current from inverter switch 53 and current transformer 65 may be provided for sensing the output current from inverter switch 54. Saturable reactors 66 and 67 are coupled to lines 43 and 44 respectively to impede current surges on lines 43 and 44.

Figure 4:
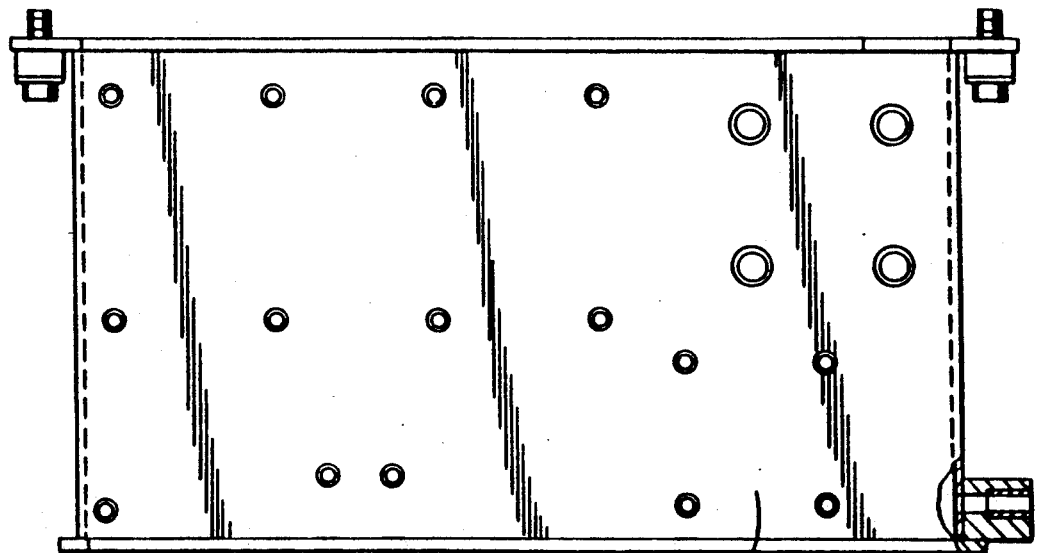
FIGS. 4-11 show a packaging arrangement for the inverter leg shown in FIG. 3.
Figure 5:
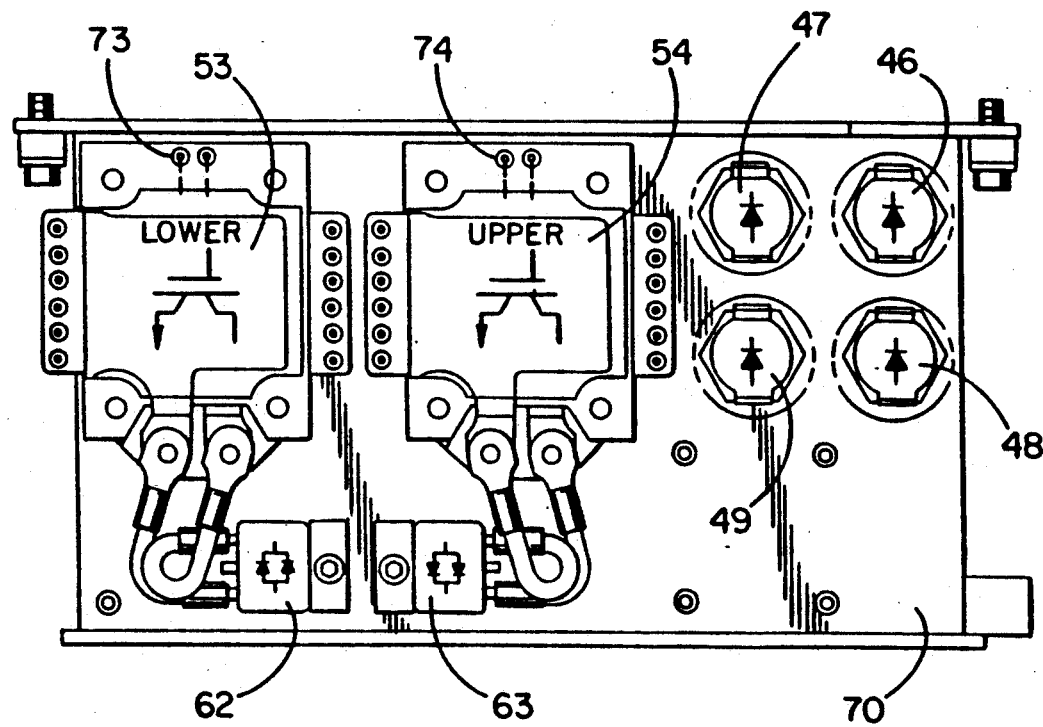

The inverter leg shown in FIG. 3 can be packaged into module 21 shown in FIG. 2 according to the package illustrated in FIGS. 4–11. As shown in FIG. 4, a heat sink has a plate 70 having a plurality of screw-receiving holes formed therein. As shown in FIG. 5, diodes 46, 47, 48, and 49 are suitably mounted to plate 70.

Similarly, inverter switches 53 and 54 and flyback diodes 62 and 63 are mounted to plate 70. Connections are provided for connecting flyback diodes 62 and 63 to corresponding inverter switches 53 and 54 in accordance with the circuit diagram of FIG. 3.

Figure 6:
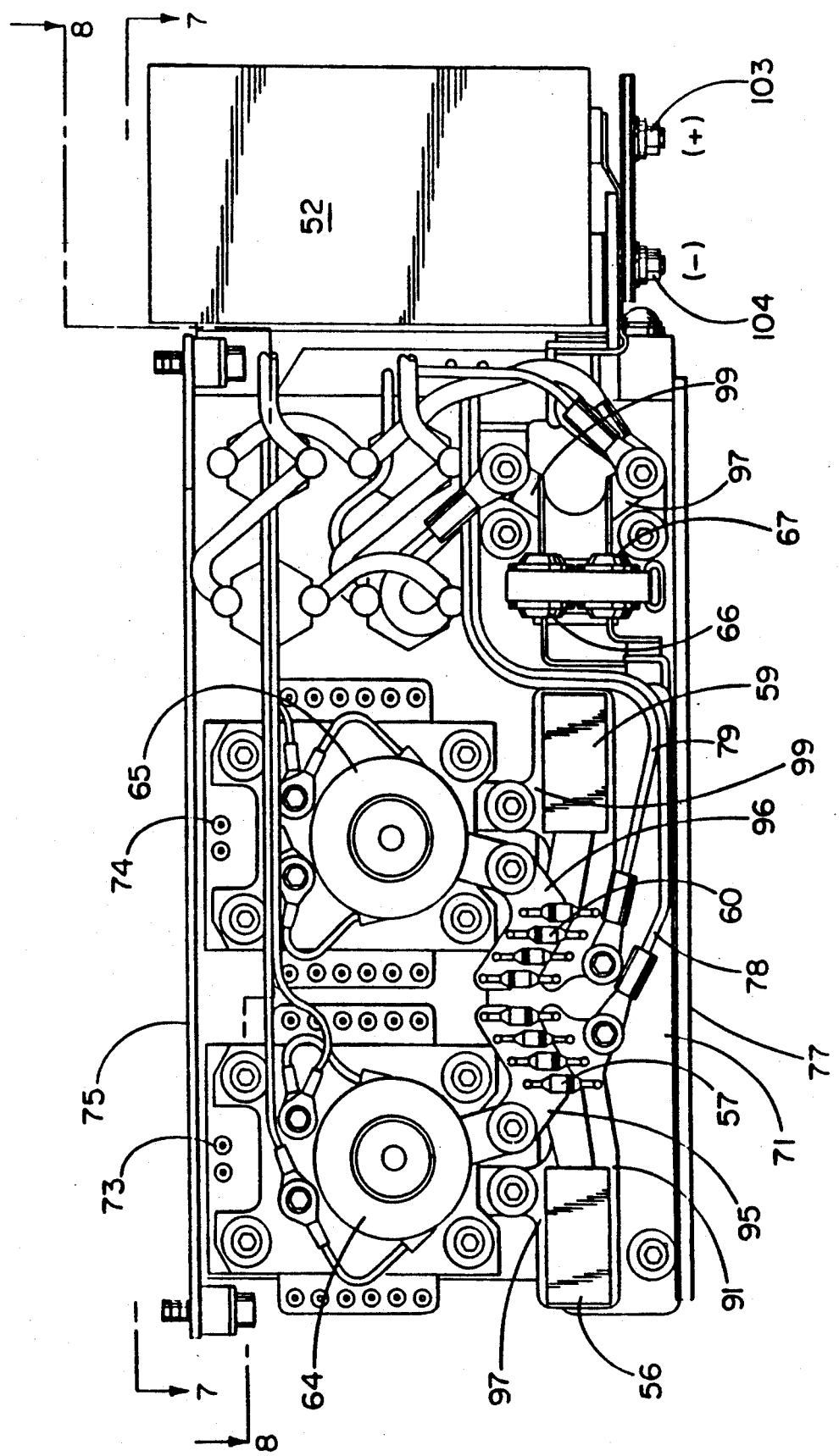
Figure 10:
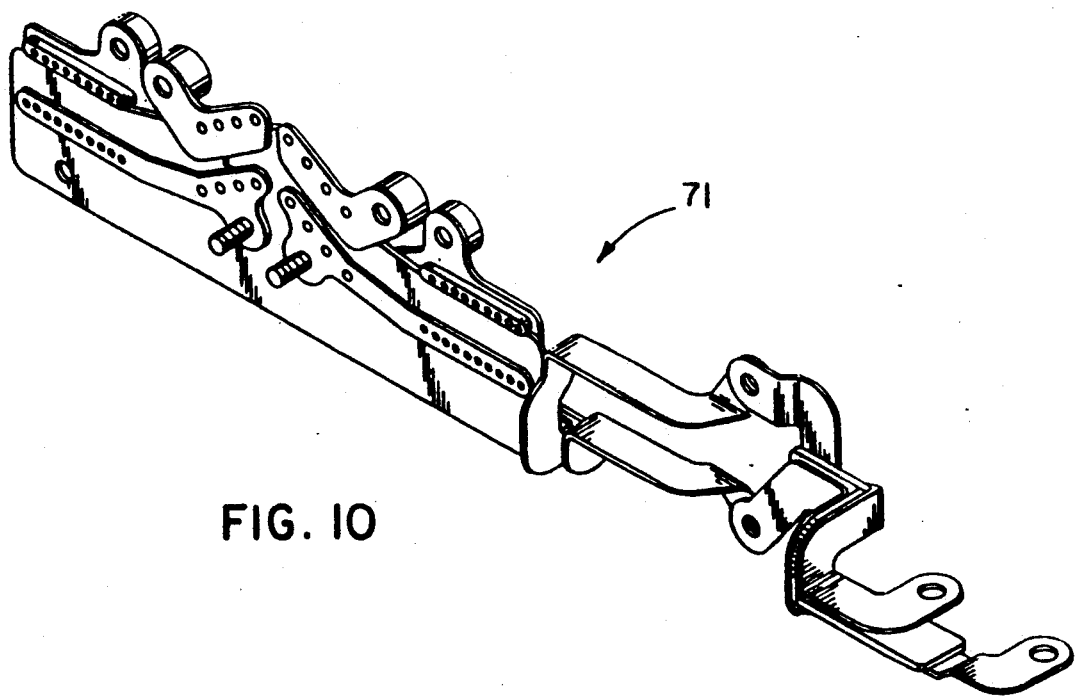
Figure 11:
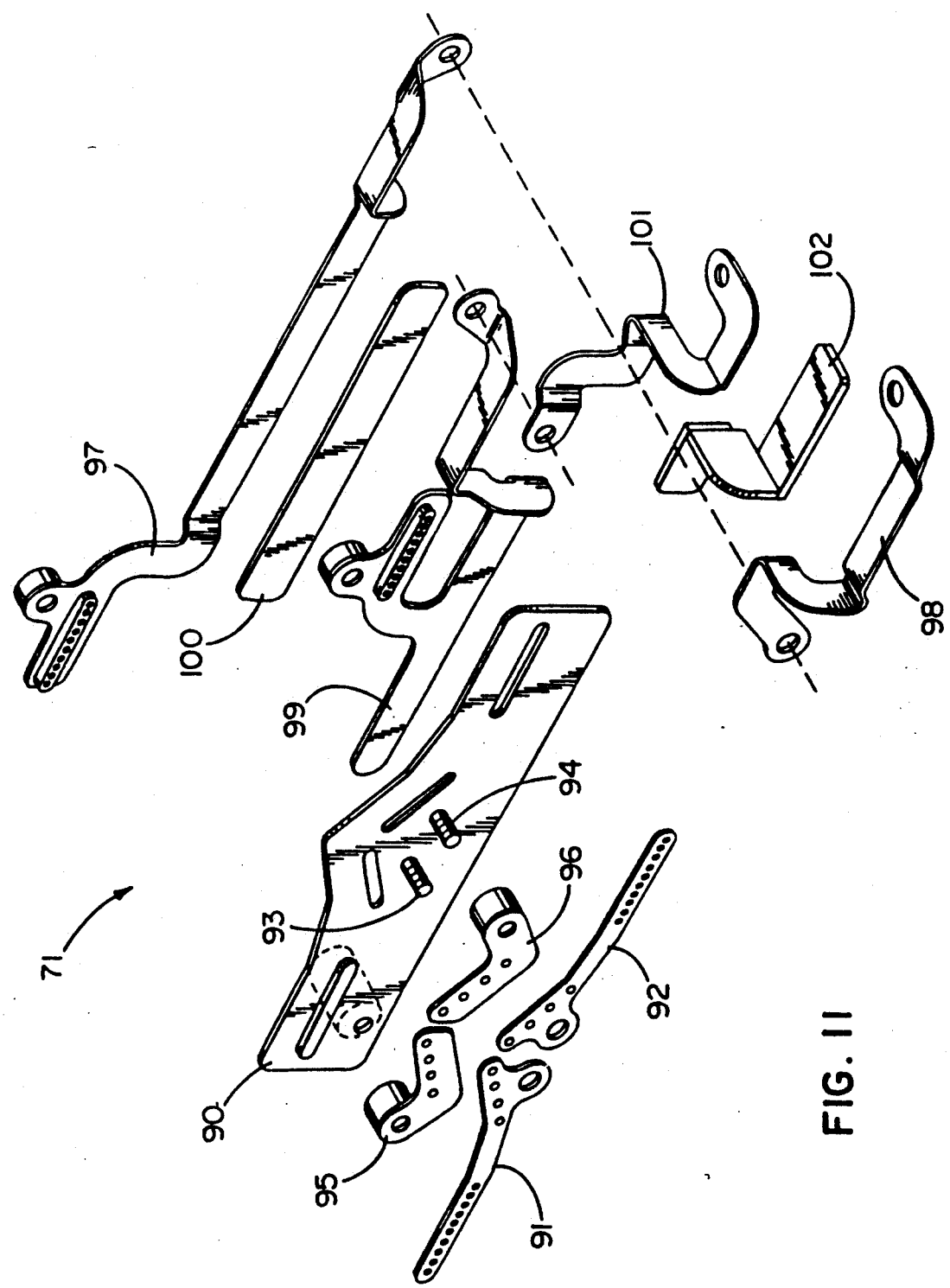

As shown in FIG. 6, bus work 71, shown in more detail in FIGS. 10 and 11, is attached to plate 70. Smoothing capacitor 52 is mounted to plate 70 and connected as will be discussed in more detail hereinbelow. Inverter switches 53 and 54 carry gate connectors 73 and 74, respectively. Clamping diodes 57 and 60, in this case four parallel diodes each, of the respective snubbers are connected by bus works 71 in series with their respective clamp capacitors 56 and 59 between corresponding collector and emitter terminals of inverter switches 53 and 54. Connector 78 connects the junction of diode 57 and capacitor 56 to one side of snubber resistor 61 and connector 79 connects the junction of diode 60 and capacitor 59 to one side of snubber resistor 58. Both resistors are located on the reverse side of the structure shown in FIG. 6. Current transformer 64 is attached over the top of inverter switch 53 and current transformer 65 is attached over the top of inverter switch 54. Both of the current transformers are provided with suitable conductors so that current transformers 64 and 65 can be used as desired. Saturable reactors 66 and 67 are also mounted to plate 70. Interconnects are provided for diodes 46, 47, 48, and 49.

Figure 7:
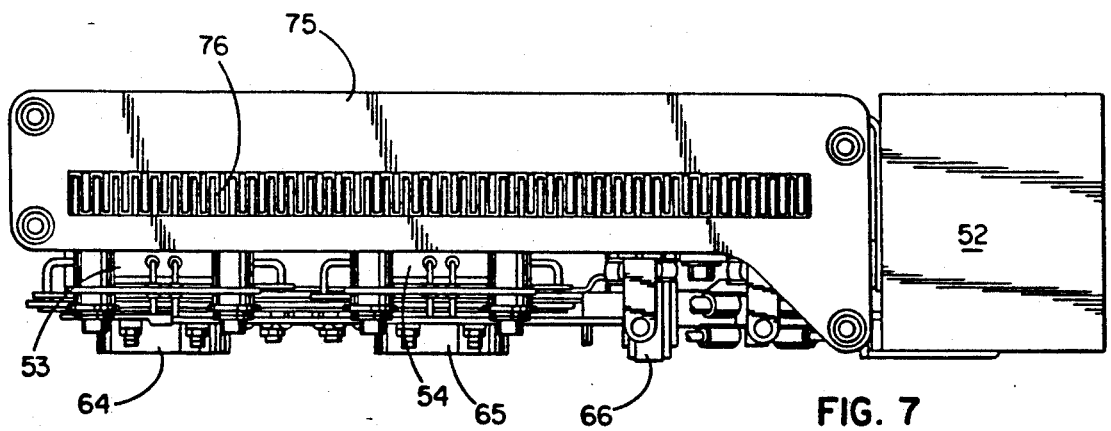

Side plate 75 is shown in FIG. 7. Side plate 75 has vent 76 therein for allowing air to flow from similar vents (not shown) in side plate 77, between plates 70 and 80, and out through vents 76 in side plate 75.

Figure 8:
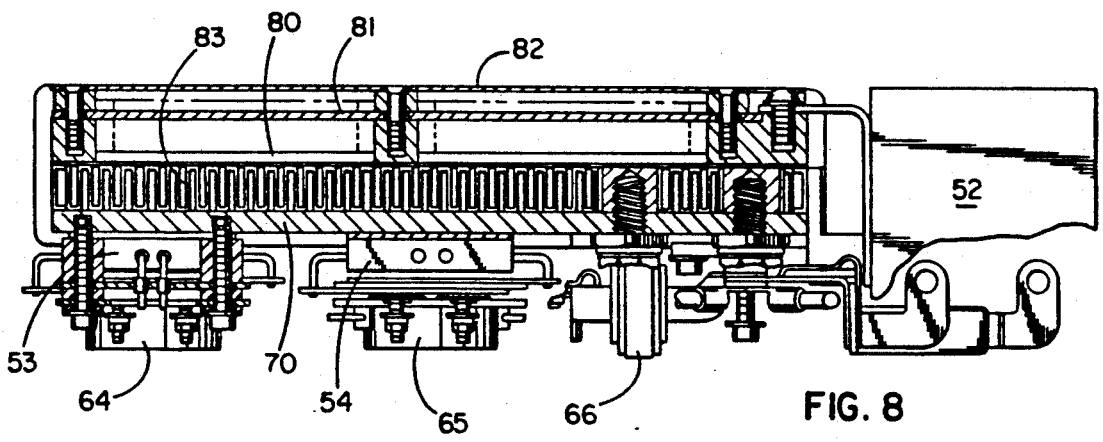
Figure 9:
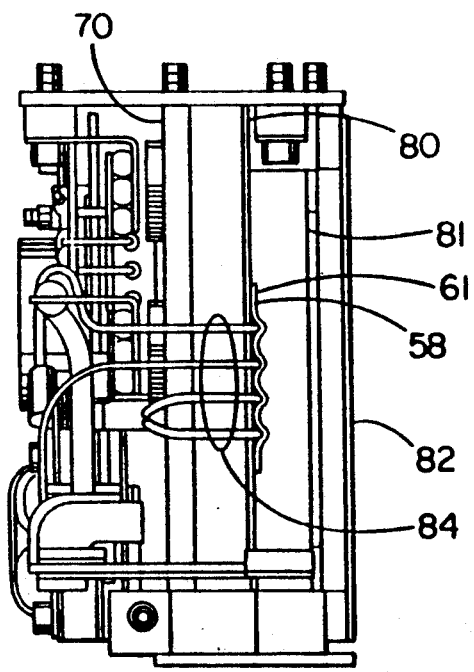

In FIG. 8, side plate 75 is removed showing heat exchanger or fins 83 sandwiched between front heat sink plate 70 and rear heat sink plate 80. Supported to the rear heat sink plate 80 is printed circuit board 81 for supporting gate drive circuitry 55 and back cover 82. Snubber resistors 58 and 61 may be film-type resistors supported on heat sink plate 80 as shown in FIG. 9 which is a side view of the module with smoothing capacitor 52 removed. Thus, lines 84 connect snubber resistors 58 and 61 as shown in FIG. 3.

Bus works 71 is shown in more detail in FIG. 10 and 11 with FIG. 10 being an assembly view and FIG. 11 being an exploded view. Main plate 90 is attached to heat sink plate 70 by suitable standoffs, such as the one shown in phantom. Conductors 91 and 92 are attached to main plate 90 by insulated standoffs 93 and 94. Connectors 91 and 92 provide one terminal, respectively, for snubber diodes 57 and 60 and corresponding snubber capacitors 56 and 59. As shown in FIGS. 6 and 9, connecting cables 78 and 79 run from connectors 91 and 92 to corresponding snubber resistors 58 and 61. Conductors 95 and 96 are suitably attached to the emitter of inverter switch 53 and the collector of inverter switch 54, respectively, such that the other sides of diodes 57 and 60 can be connected to respective conductors 95 and 96. Conductor 97 runs behind plate 90 and connects at one end to the collector of inverter switch 53 and at its other end to one side of rectifiers 46 and 48 by suitable cables. Connector 99, held away from connector 97 by insulated spacer 100, is connected to the emitter of inverter switch 54 and to one terminal 104 of smoothing capacitor 52 through connector 101. Conductor 98 is connected to conductor 97 and also to terminal 103 of smoothing capacitor 52. Conductors 98 and 101 are separated by insulated spacer 102. Input rectifier 46 and 48 are connected to the connector 97 by appropriate, wires. Also input rectifier diodes 47 and 49 are connected to the connector 99 in a similar manner. Input rectifier diodes 46 and 47 are initially connected to a separate generator from input rectifier diodes 48 and 49. Also, it may be necessary to interconnect the positive DC rails of each of the inverters legs together and the negative DC rails of each of the inverter legs together to insure the same level of DC input to the inverter switches of each of the three inverter legs.

Accordingly, inverter leg 42 as shown in FIG. 3 is mounted on a heat sink to cool its various components and when assembled as shown in FIGS. 4-11 provides one of the modules 21, 22, and 23 for insertion into box 20. Two other modules, such as that shown in FIGS. 3-11, may also be provided for the modules 22 and 23 in FIG. 2. Thus, modules 21, 22, and 23 each supply a phase of three-phase output AC and can be carried in or on a chassis such as box 20 shown in FIG. 2. If a component on one of the modules fails, that module can be withdrawn from box 20 and replaced by a functional module. Thus, only one module needs to be replaced at a time and each module provides a single heat exchanger for both the AC/DC converter and the DC/AC inverter.

Figure 12A:
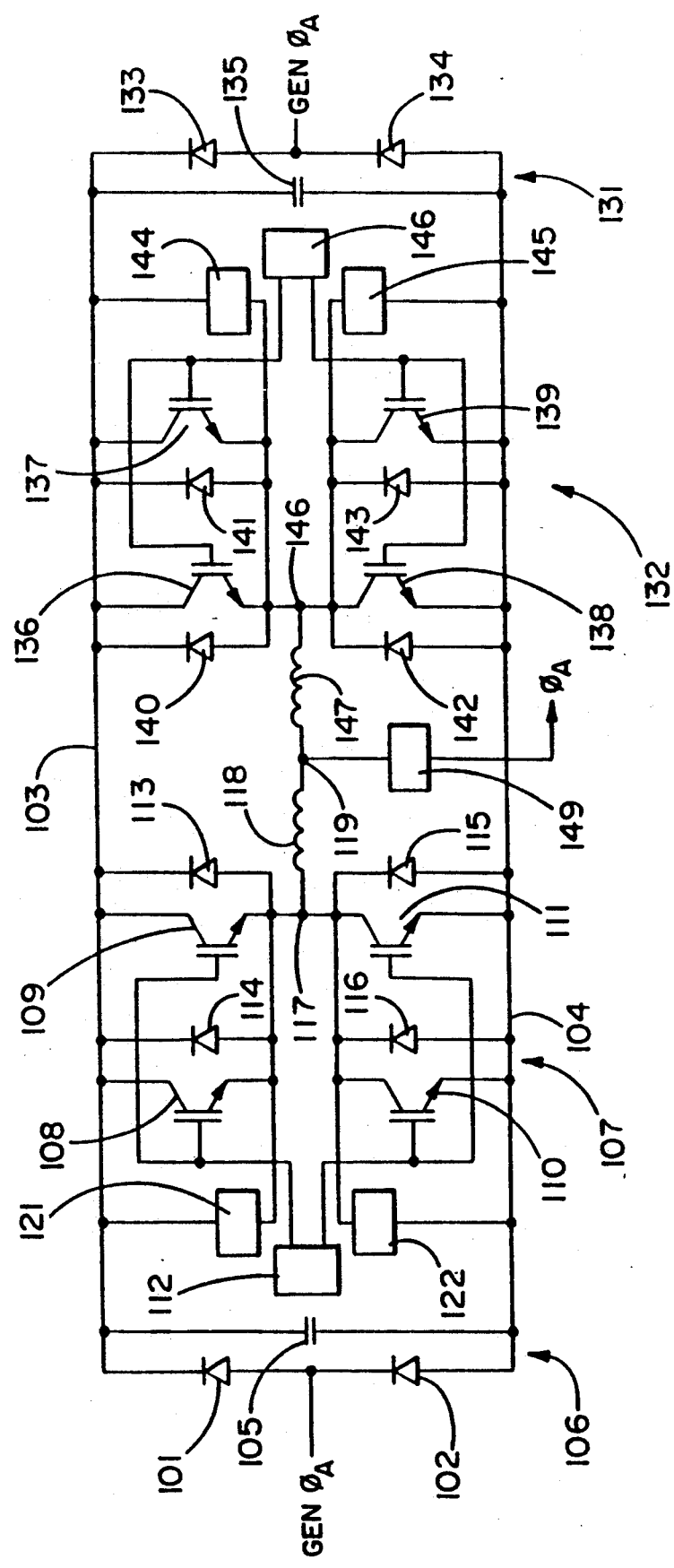
FIGS. 12A, 12B and 12C show three inverter legs of a three-phase power conversion system according to another embodiment of the invention.

A second embodiment of the invention is shown in FIGS. 12A-16. One inverter leg for producing phase A voltage is shown in FIG. 12A, a second inverter leg for producing phase B voltage is shown in FIG. 12B, and a third inverter leg for producing phase C voltage is shown in FIG. 12C. Since each inverter leg carries essentially the same components, only one inverter leg will be described. The phase separation between output phases A, B, and C is provided by the gate drive circuit for each inverter leg such that the inverter switches of an inverter leg are gated with a 120° phase displacement with respect to the inverter switches of the other two legs. With the system shown in FIGS. 12A, 12B, and 12C, when a switch in the inverter leg shown in FIG. 12A is gated on for supplying output phase A power, a switch in one or both of the other inverter legs shown in FIGS. 12B and 12C is also gated on to provide a return for the current. This control of the inverter legs can be similar to the control shown in U.S. Pat. No. 4,882,120. Also, the AC/DC converter rectifiers are shared between the inverter leg shown in FIGS. 12A, 12B, and 12C. Thus, when the phase A output of the generator is positive with respect to the phase B output, for example, current flows from generator output phase A through the top diode shown in FIG. 12A through inverter switches in both FIGS. 12A and 12B, and back to generator output phase B through a bottom diode in inverter leg of FIG. 12B corresponding to the bottom diode shown in FIG. 12A.

As shown in FIG. 12A, diodes 101 and 102 are connected in series across DC lines 103 and 104. The junction of diodes 101 and 102 receives a first output phase from an AC source such as a three-phase generator. Smoothing capacitor 105 is connected between DC lines 103 and 104 to smooth out the ripples in the DC supplied by the rectifier bridge. Inverter switches 107 comprises two sets of parallel transistors or inverter switches connected across DC lines 103 and 104. Thus, inverter switches 108 and 109 have their collectors connected together, their emitters connected together, and their bases connected together. The bases of switches 108 and 109 are connected to gate drive circuit 112 as are the bases of inverter switches 110 and 111. Flyback diodes 113 and 114 are connected from the emitters of inverter switches 108 and 109 to their collectors. Similarly, flyback diodes 115 and 116 are connected from the emitters of transistors 110 and 111 to their collectors. Junction 117 is connected to the emitters of inverter switches 108 and 109 and to the collectors of inverter switches 110 and 111. Junction 117 is connected through one winding 118 of an interphase transformer to junction 119. Snubber circuit 121 is connected across the collector and emitter terminals of inverters 108 and 109 and snubber circuit 122 is connected across the collector and emitter circuits of transistors 110 and 111. The components described so far, with the exception of winding 118, are connected on one side of a module support and form one inverter leg of a power conversion system.

A second portion of FIG. 12A forms an inverter leg of a second inverter. The two inverters can be operated with a phase shift in a manner described in copending application Ser. No. 07/745,425, filed on Aug. 15, 1991. Consequently, the second inverter includes its own AC/DC converter 131 and DC/AC inverter switches 132. The first and second inverters shown in FIG. 12A need not include both AC/DC converters 106 and 131, but may share a single AC/DC converter.

AC/DC converter 131 includes diodes 133 and 134 connected in series across DC lines 103 and 104. The junction of diodes 133 and 134 receives the phase output from the AC power supply which may be, for example, a three-phase generator. Smoothing capacitor 135 is connected across DC lines 103 and 104 in order to smooth out any ripples produced by diodes 133 and 134.

Inverter switches 132 includes inverter switches 136 and 137 having their collectors connected together, their emitters connected together, and their bases connected together and inverter switches 138 and 139 similarly having their collectors connected together, their emitters connected together, and their bases connected together. Flyback diodes 140 and 141 are connected from the emitters of inverter switches 136 and 137 to their collectors. Flyback diodes 142 and 143 are connected from the emitters of inverter switches 138 and 139 to their collectors. Snubbing circuit 144 is connected across the collector and emitters of inverter switches 136 and 137 and snubber circuit 145 is connected across the collectors and emitters of inverter switches 138 and 139. Gate drive circuit 146 is provided to control gating of inverter switches 136, 137, 138, and 139. The emitters of inverter switches 136 and 137 are connected to junction 150 as are the collectors of inverter switches 138 and 139. Junction 150 is connected through second winding 147 of the interphase transformer to junction 119. Junction 119 is connected through filter 149 to the phase A output terminal which provides phase A output AC.

Figure 12B:
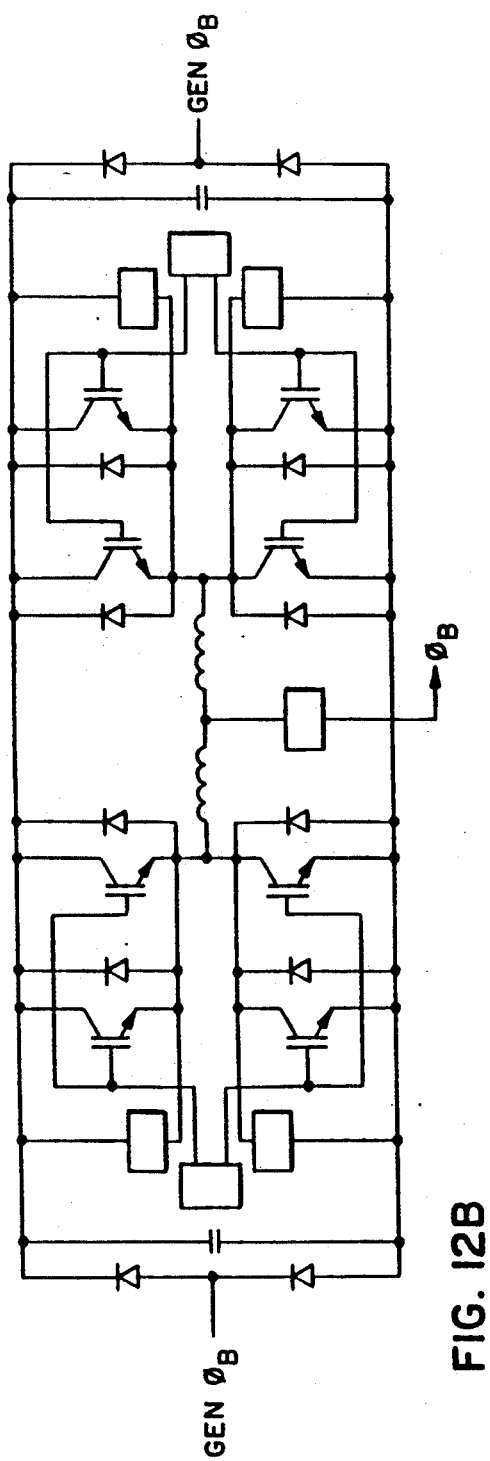
Figure 12C:
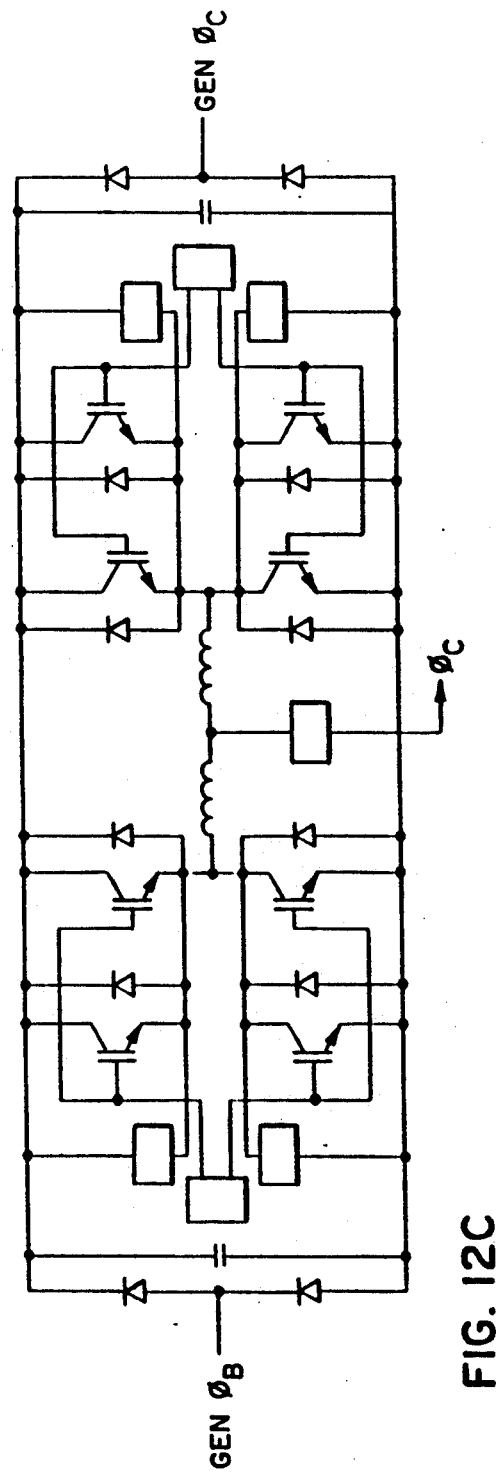

FIGS. 12B and 12C each may be nearly identical to the circuit shown in FIG. 12A. The only difference is in the waveforms used to drive the inverter switches. The waveforms driving the inverter switches of FIG. 12A are separated from those used in FIGS. 12B and 12C by 120° and 240°, respectively.

Figure 13:
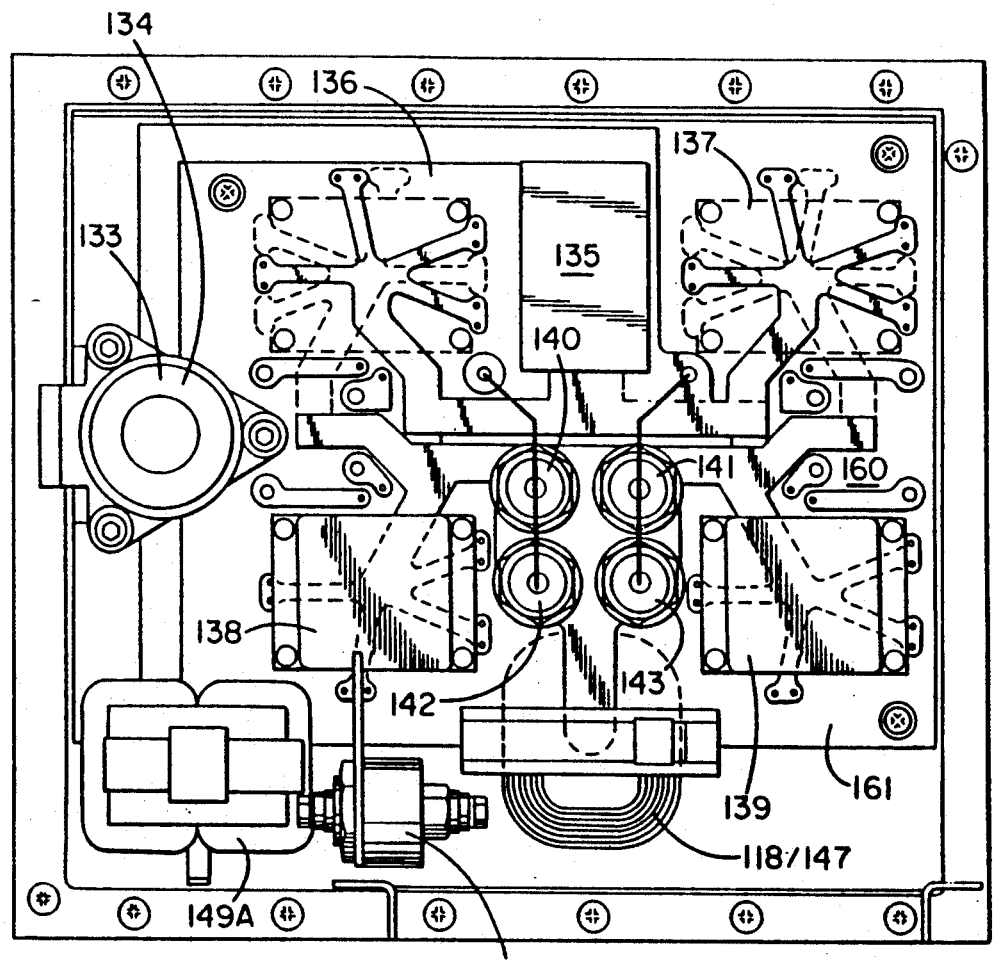
FIGS. 13-16 show an alternative packaging arrangement useful in packaging one of the inverter legs shown in FIGS. 12A-12C.
Figure 14:
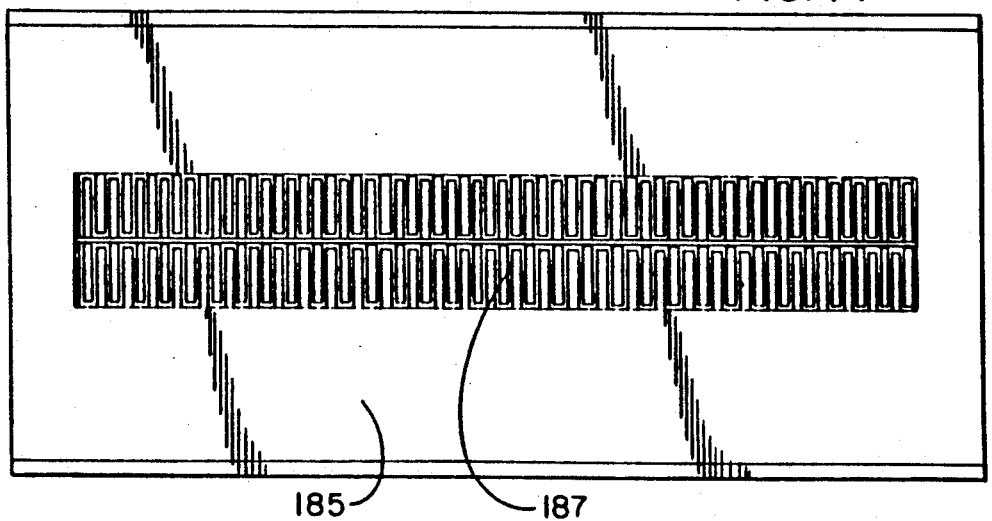
Figure 15:
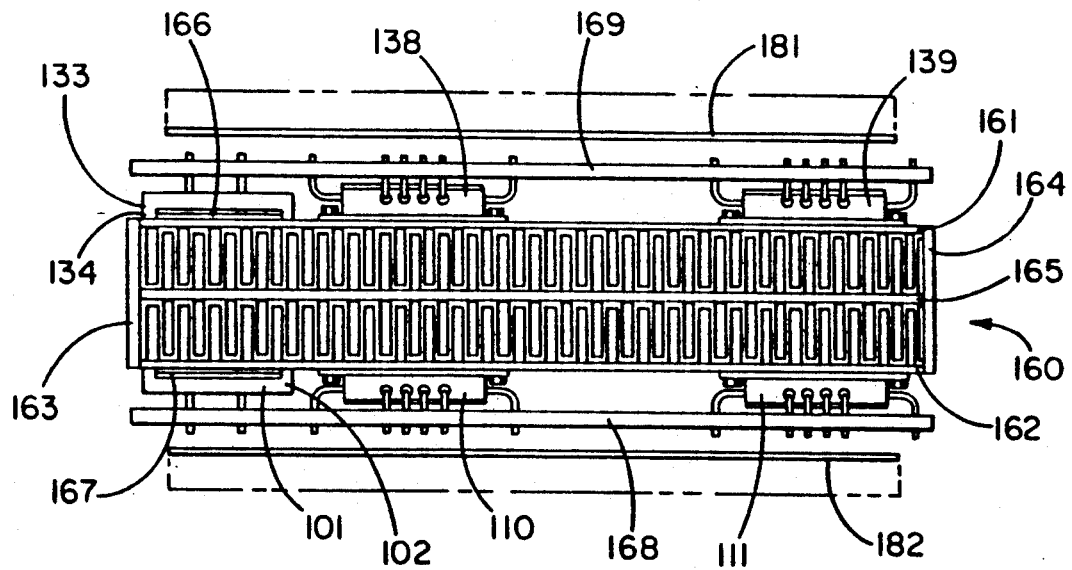
Figure 16:
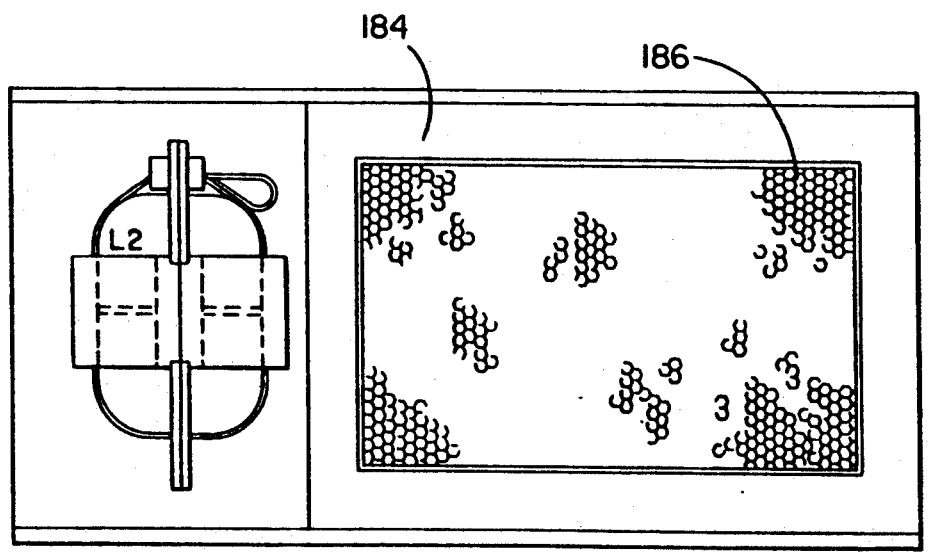

The first and second inverters shown in FIG. 12A can be packaged in accordance with FIGS. 13-16. As shown in FIG. 15, one of the modules, such as module 21 shown in FIG. 2, includes heat exchanger 160 having first and second plates 161 and 162, side plates 163 and 164, and separator plate 165. These plates form an air passage so that air can flow between plates 161 and 162 for the cooling thereof. Fins may be inserted into the air passageways in order to facilitate the transfer of heat to the air flowing through the passageways. Mounted directly to the surface of cooling plate 162 are transistors 110 and 111. Mounted behind transistor 110 on cooling plate 162, as viewed in FIG. 15, is transistor 108 and mounted behind transistor 111 on cooling plate 162 is transistor 109. Since inverter witches 108, 109, 110, and 111 are directly in contact with cooling plate 162, they are efficiently cooled thereby. Similarly, transistors 138 and 139 are mounted in direct contact with cooling plate 161. Inverter switch 136 is mounted to cooling plate 161 behind inverter switch 138 and inverter switch 137 is mounted to cooling plate 161 directly behind inverter switch 139.

Also mounted directly to cooling surfaces 161 and 162 are diode pairs 133/134 and 101/102, respectively. Film resistors 166 and 167, which can be used in the snubber circuits 121, 122, 144, and 145 shown in FIG. 12A are mounted directly to corresponding surfaces 161 and 162.

Inverter switches 108, 109, 110, and 111 are innerconnected by printed wiring board 168. Printed wiring board 168 also receives diodes 101/102. Mounted on printed circuit board 168 (although not shown in the drawings) are the rest of the components of snubber circuits 121 and 122. Diodes 113, 114, 115, and 116 are attached directly to heat exchanger surfaces 161 and 162 to provide cooling. Similarly, printed wiring board 169 interconnects diode pair 133/134 and inverter switches 136, 137, 138, and 139 according to the wiring diagram shown in FIG. 12A.

FIG. 13 shows the top of the structure shown in FIG. 15. FIG. 13 is a partial showing only and illustrates the interrelationship between the various circuit components, cooling plate 161, and printed circuit board 169. Smoothing capacitor 135 can be carried by printed wiring board 169, interphase transformer 118/167 is held by a bracket against the side of heat exchanger 160 as are inductor 149A and capacitor 149B which form filter 149 of FIG. 12A.

In FIG. 15, board 181 is attached by means not shown to printed wiring board 169 and carries gate drive 146 thereon. Similarly, board 182 is attached to printed wiring board 168 and carries gate drive 112 thereon. When the module is constructed as shown in FIGS. 13 and 15, bottom plate 184 is secured over the top of the arrangement as viewed in FIG. 15 and top plate 185, as shown in FIG. 14, is applied to the other side of heat exchanger 160. Plate 184 has honeycomb 186 therein and plate 185 has vents 187 therein. Accordingly, air is allowed to flow through top plate 185, down through heat exchanger 160, and out through honeycomb 186 in bottom plate 184 to cool plates 161 and 162 as well as any components mounted thereon. When assembled, this module can then be inserted into box 20 shown in FIG. 2. The other two modules can be similarly packaged and inserted as modules 22 and 23, also shown in FIG. 2. Plates 184 and 185 also assist in limiting EMI outside of the inverter housing.

Therefore, an inverter module is disclosed which produces a single phase of output AC. In a three-phase system, accordingly, three modules will be provided, one for phase A, one for phase B, and one for phase C. These modules can be held by a chassis such as box 20 shown in FIG. 2 so that they can be installed as a unit. Each module, carrying at least an AC/DC converter and a DC/AC inverter for supplying one phase of output AC, can be attached to, or withdrawn from, the chassis as a unit and provides a single heat exchanger for converter and inverter components so that heat exchange packaging and duct work is saved by sharing the same heat sink. If one of the modules in a three-phase system needs to be replaced, that one module can be withdrawn for replacement without the need of replacing the whole three-phase power system.

What is claimed is:

1. A module for receiving input AC and for supplying only one phase of output AC, wherein said module can be attached to and/or withdrawn form a module support as a unit, said module comprising:

heat sink means for cooling components attached in cooling relation thereto;

rectifier means for rectifying said input AC into DC, said rectifier means being attached in cooling relation to said heat sink means;

inverter switching means for inverting said DC into said one phase of said output AC, said inverter switching means being attached, at least in part, in cooling relation to said heat sink means, said inverter switching means including an AC filter having an inductor and a capacitor attached to said heat sink means; and connector means for interconnecting said rectifier means and said inverter switching means so that said input AC, when supplied to said module, is converted to said one phase of said output AC.

2. The module of claim 1 wherein said inverter switching means comprises inverter switches mounted in cooling relation to said heat sink means and switch control means for controlling said inverter switching means, said switch control means being attached to said heat sink means.

3. The module of claim 2 wherein said heat sink means comprises first and second cooling plates separated by a passageway for allowing cooling fluid to flow between said first and second cooling plates, wherein said rectifier means comprises first and second sets of rectifiers, said first set of rectifiers being attached in cooling relation to said first cooling plate and said second set of rectifiers being attached in cooling relation to said second cooling plate, wherein said inverter switches comprises first and second sets of inverter switches, said first set of inverter switches being attached in cooling relation to said first cooling plate and said second set of inverter switches being attached in cooling relation to said second cooling plate, and wherein said switch control means comprises first and second switch controllers, said first and said second switch controllers being attached to said heat sink means, said connector means interconnecting said first set of rectifiers, said first set of inverter switches, and said first switch controller so that said input AC, when supplied to said module, is converted to a first output AC and interconnecting said second set of rectifiers, said second set of inverter switches, and said second switch controller so that said input AC, when supplied to said module, is converted to a second output AC.

4. The module of claim 3 wherein said connector means comprises a transformer connected to said first and second sets of inverter switches so that said first and second output ACs are combined into said one phase of said output AC.

5. The module of claim 1 wherein said heat sink means comprises first and second cooling plates separated by a passageway for allowing cooling fluid to flow between said first and second cooling plates, wherein said rectifier means comprises first and second sets of rectifiers, said first set of rectifiers being attached in cooling relation to said first cooling plate and said second set of rectifiers being attached in cooling relation to said second cooling plate, wherein said inverter switching means comprises first and second sets of inverter switches, and said first set of inverter switches being attached in cooling relation to said first cooling plate and said second set of inverter switches being attached in cooling relation to said second cooling plate, said connector means interconnecting said first set of rectifiers and said first set of inverter switches so that said input AC, when supplied to said module, is converted to a first output AC and interconnecting said second set of rectifiers and said second set of inverter switches so that said input AC, when supplied to said module, is converted to a second output AC.

6. The module of claim 5 wherein said connector means comprises a transformer connected to said first and second sets of inverter switches so that said first and second output ACs are combined into said one phase of said output AC.

7. The module of claim 1 wherein said heat sink means comprises at least a first cooling plate having first and second sides, said heat sink means having a passageway on said first side of said first cooling plate for allowing cooling fluid to cool said first cooling plate, said rectifying means and said inverter switching means being attached directly to said second side of said first cooling plate.

8. The module of claim 7 wherein said inverter switching means comprises inverter switches mounted in cooling relation to said heat sink means and switch control means for controlling said inverter switching means, said switch control means being attached to said heat sink means.

9. The module of claim 8 wherein said passageway has a first side for cooling said first cooling plate and a second side, and said heat sink means comprises gate drive support means for supporting said switch control means on said second side of said passageway.

10. The module of claim 9 wherein said inverter switching means comprises resistors mounted in cooling relation to said second side of said passageway.

11. The module of claim 10 wherein said rectifier means comprises diodes attached in cooling relation to said second side of said first cooling plate and a smoothing capacitor attached to said heat sink means.

12. An inverter system for supplying output AC having at least three phases, said inverter system including at least three inverter modules, each module supplying one of said at least three phases of said output AC and being arranged so that it can be attached to and/or withdrawn from a module support as a unit, wherein said inverter modules, when interconnected, forming said inverter system for providing said output AC having said at least three phases, said inverter system comprising:

a module support having at least first, second and third receiving means, each receiving means receiving one of said modules; and at least three modules for supplying said output AC having said at least three phases, each of said modules having
heat sink means for cooling components attached in cooling relation thereto,
rectifier means for rectifying input AC into DC, said rectifier means being attached in cooling relation to said heat sink means,
inverter switching means for inverting said DC into one of said phases of said output AC, said inverter switching means being attached in cooling relation at least in part to said heat sink means, and
connector means for interconnecting said rectifier means and said inverter switching means so that said input AC, when supplied to said module, is converted to said one of said responding phase of said output AC.

13. The inverter system of claim 12 wherein said inverter switching means on each of said modules comprises a AC filter including an inductor and a capacitor attached to said heat sink means.

14. The inverter system of claim 12 wherein said inverter switching means of each module comprises inverter switches mounted in cooling relation to said heat sink means and switch control means for controlling said corresponding inverter switches, said switch control means being attached to said heat sink means.

15. The inverter system of claim 14 wherein said heat sink means on each of said modules comprises first and second cooling plates separated by a passageway for allowing cooling fluid to flow between said first and second cooling plates, wherein said rectifier means on each of said modules comprises first and second sets of rectifiers, each of said first sets of rectifiers being attached in cooling relation to a corresponding first cooling plate and each of said second sets of rectifiers being attached in cooling relation to a corresponding second cooling plate, wherein said inverter switches on each of said modules comprises first and second sets of inverter switches, each of said first sets of inverter switches being attached in cooling relation to a corresponding first cooling plate and each of said second sets of inverter switches being attached in cooling relation to a corresponding second cooling plate, and wherein said switch control means on each of said modules comprises first and second switch controllers, each of said first switch controllers being attached to a corresponding first cooling plate and each of said second switch controllers being attached to a corresponding second cooling plate, said connector means interconnecting a corresponding first set of rectifiers, first set of inverter switches, and first switch controller so that said input AC, when supplied to said module, is converted to a first output AC and interconnecting a corresponding second set of rectifiers, second set of inverter switches, and second switch controller so that said input AC, when supplied to said module, is converted to a second output AC.

16. The inverter system of claim 15 wherein said first set of rectifiers on each of said modules cooperate interdependently to convert said input AC to DC for use by said first set of inverter switches on each of said modules and said second set of rectifiers on each of said modules cooperate interdependently to convert said input AC to DC for use by said second set of inverter switches on each of said modules.

17. The inverter system of claim 16 wherein said connector means comprises a transformer connected to said first and second sets of inverter switches so that said first and second output ACs are combined into said one phase of said output AC.

18. The inverter system of claim 16 wherein said inverter switching means on each of said modules comprises an AC filter including an inductor and a capacitor attached to said heat sink means.

19. The inverter system of claim 12 wherein said heat sink means on each of said modules comprises first and second cooling plates, separated by a passageway, for allowing cooling fluid to flow therebetween, wherein said rectifier means on each of said modules comprises first and second sets of rectifiers, each of said first sets of rectifiers being attached in cooling relation to a corresponding first cooling plate and each of said second sets of rectifiers being attached in cooling relation to a corresponding second cooling plate, and wherein said inverter switching means on each of said modules comprises first and second sets of inverter switches, each of said first sets of inverter switches being attached in cooling relation to a corresponding first cooling plate and each of said second sets of inverter switches being attached in cooling relation to a corresponding second cooling plate, said connector means interconnecting a first set of rectifiers and a corresponding first set of inverter switches so that said input AC, when supplied to said module, is converted to a first output AC and interconnecting a second set of rectifiers and a corresponding second set of inverter switches so that said input AC, when supplied to said module, is converted to a second output AC.

20. The inverter system of claim 18 wherein said first set of rectifiers on each of said modules cooperate interdependently to convert said input AC to DC for use by said first set of inverter switches on each of said modules and said second set of rectifiers on each of said modules cooperate interdependently to convert said input AC to DC for use by said second set of inverter switches on each of said modules.

21. The inverter system of claim 20 wherein said connector means comprises a in each of said modules connected to said corresponding first and second sets of inverter switches so that said first and second output ACs are combined into a corresponding one of said phases of said output AC.

22. The inverter system of claim 12 wherein said heat sink means on each module comprises a cooling plate having first and second sides, said heat sink means of each module having a passageway on a corresponding first side of a corresponding cooling plate for allowing cooling fluid to cool said corresponding cooling plate, a corresponding rectifying means and inverter switching means being attached directly to a corresponding second side of said corresponding cooling plate.

23. The inverter system of claim 22 wherein said inverter switching means of each module comprises inverter switches mounted in cooling relation to a corresponding cooling plate and switch control means for controlling said corresponding inverter switches, said switch control means of each module being attached to a corresponding cooling plate.

24. The inverter system of claim 23 wherein said passageway of each module has a first side for cooling said corresponding cooling plate and a second side, and each of said heat sink means comprises gate drive support means for supporting a corresponding switch control means on said corresponding second side of said corresponding passageway.

25. The inverter system of claim 24 wherein said said inverter switching means of each module comprises corresponding resistors mounted in cooling relation to a second side of a corresponding passageway.

26. The inverter system of claim 25 wherein each of said rectifier means comprises diodes attached in cooling relation to a corresponding second side of a corresponding cooling plate and smoothing capacitor means attached to a corresponding heat sink means.

* * * * *